Dec. 30, 1952     W. O. CARTIER ET AL     2,623,924

SYSTEM OF AIRBORNE CONDUCTOR MEASUREMENTS

Filed July 6, 1951     6 Sheets-Sheet 1

INVENTORS
WILLIAM O. CARTIER
GEORGE H. McLAUGHLIN
WILLIAM A. ROBINSON
EDMUND M. WISE

BY

ATTORNEY

Dec. 30, 1952 W. O. CARTIER ET AL 2,623,924
SYSTEM OF AIRBORNE CONDUCTOR MEASUREMENTS
Filed July 6, 1951 6 Sheets-Sheet 2
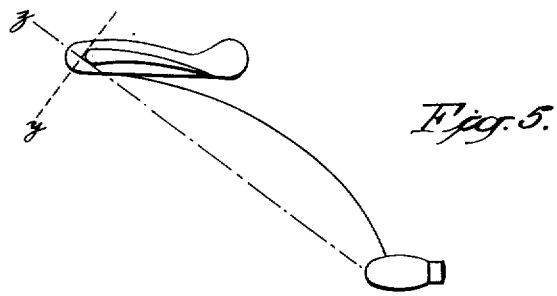
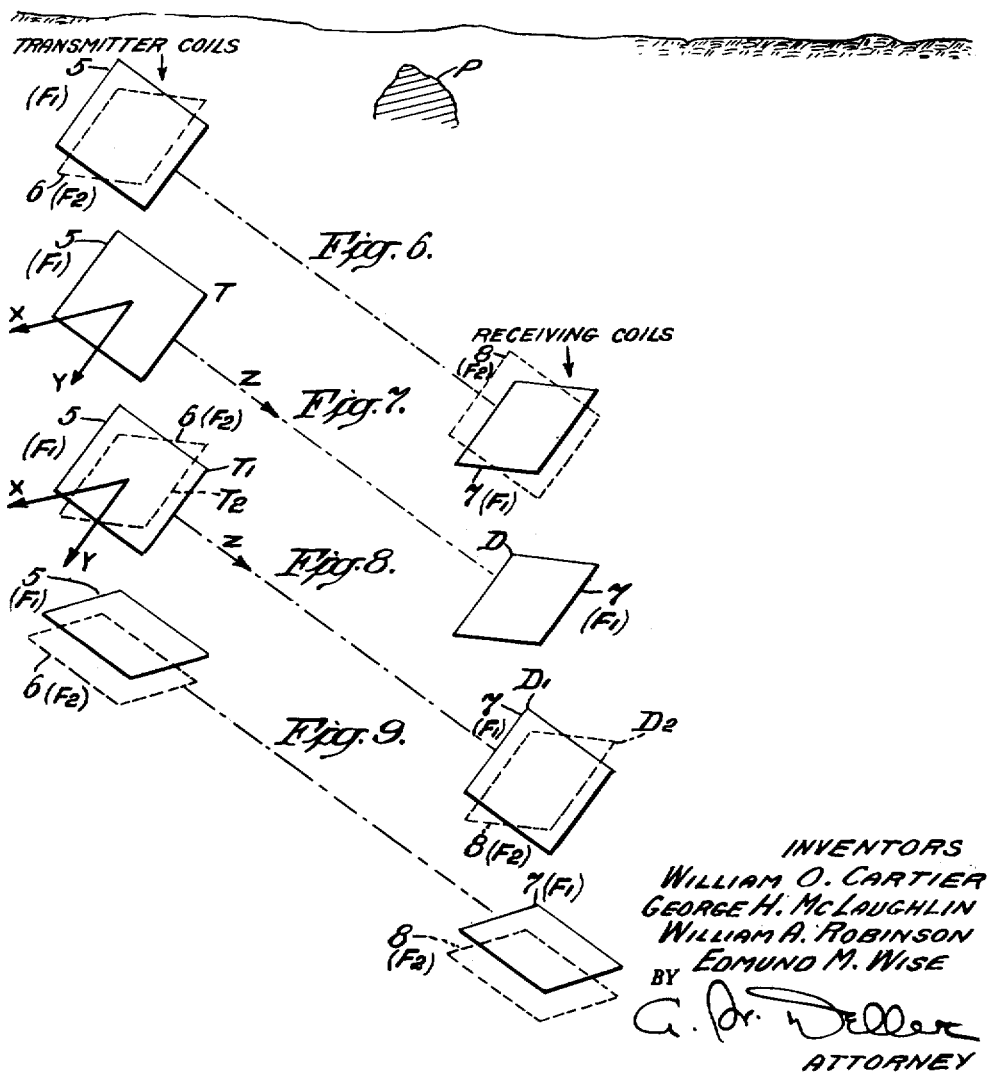
INVENTORS
WILLIAM O. CARTIER
GEORGE H. McLAUGHLIN
WILLIAM A. ROBINSON
EDMUND M. WISE
BY
ATTORNEY Dec. 30, 1952 — W. O. CARTIER ET AL — 2,623,924
SYSTEM OF AIRBORNE CONDUCTOR MEASUREMENTS
Filed July 6, 1951 — 6 Sheets-Sheet 3

TRANSMITTER COILS — RECEIVING COILS

VARIATION OF SECONDARY FIELD FOR MASSIVE SULFIDE ORE BODY

INVENTORS
WILLIAM O. CARTIER
GEORGE H. MCLAUGHLIN
WILLIAM A. ROBINSON
EDMUND M. WISE
BY
ATTORNEY

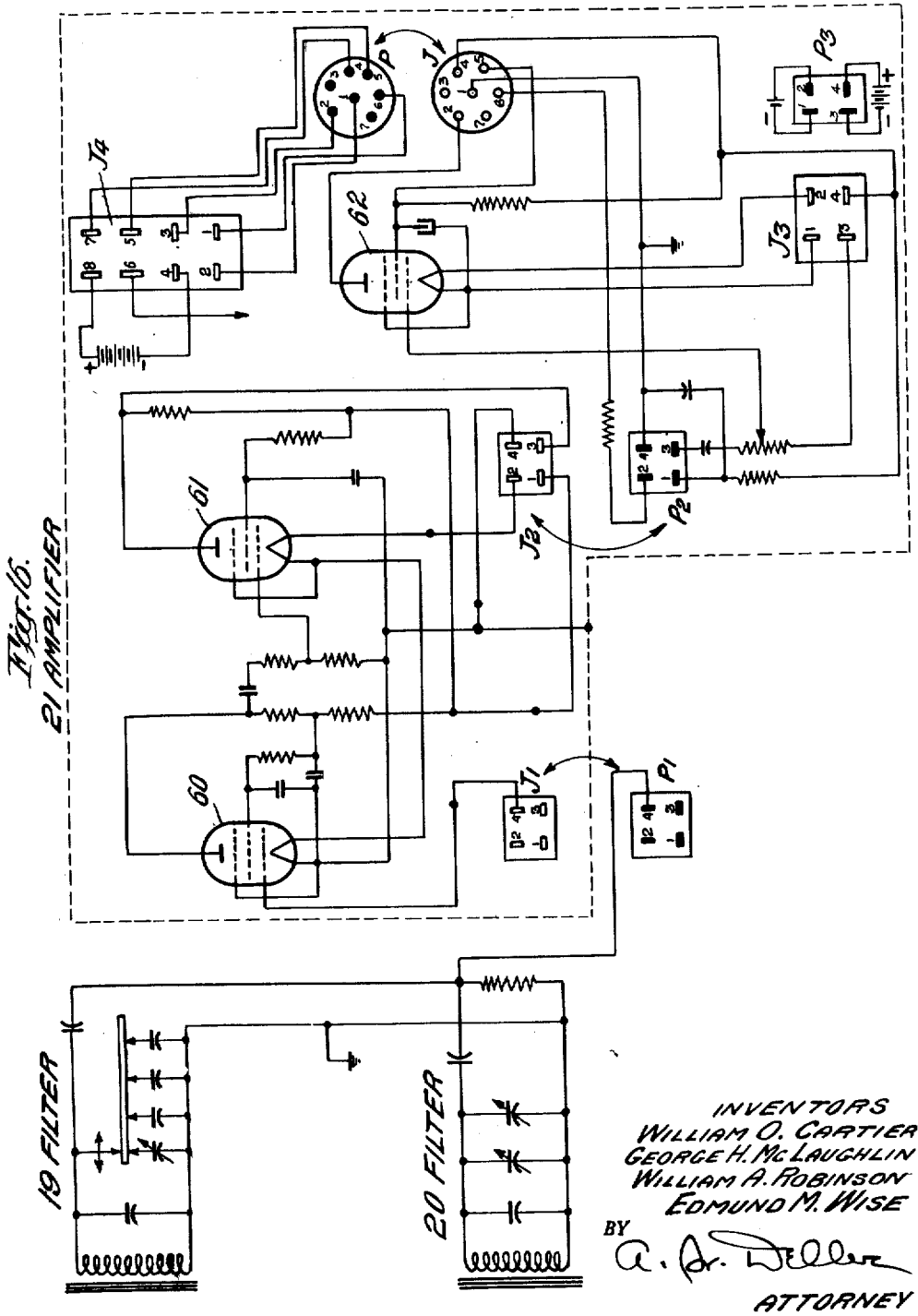

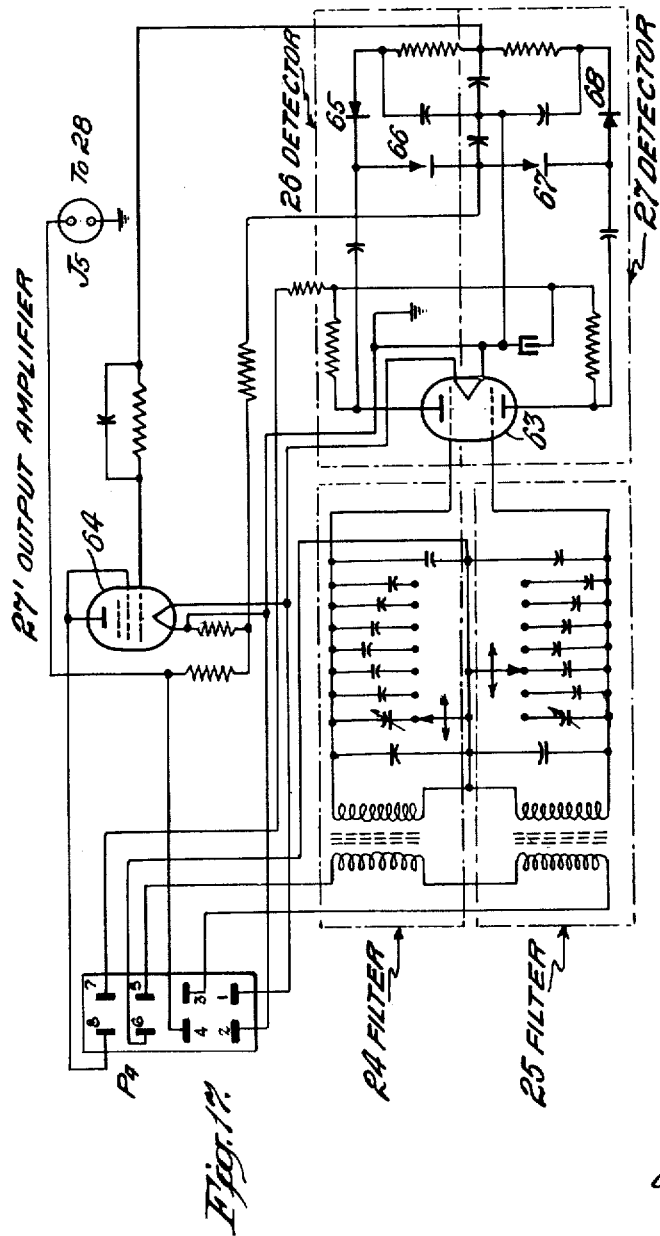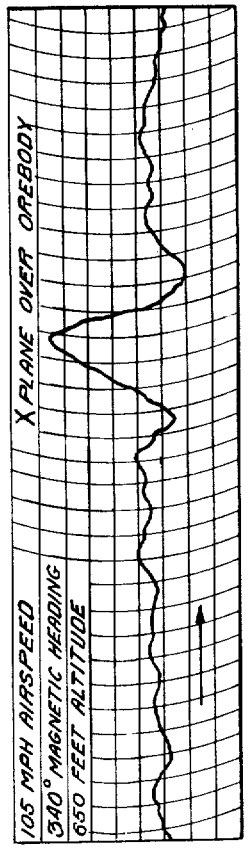

Patented Dec. 30, 1952

2,623,924

UNITED STATES PATENT OFFICE 2,623,924

SYSTEM OF AIRBORNE CONDUCTOR MEASUREMENTS

William Oliver Cartier, George Harrison McLaughlin, and William Allan Robinson, Toronto, Ontario, Canada, and Edmund Merriman Wise, Westfield, N. J., assignors to The International Nickel Company of Canada, Limited, Copper Cliff, Ontario, Canada, a Canadian company Application July 6, 1951, Serial No. 235,516
In Canada August 11, 1950

11 Claims. (Cl. 175—182)

The present invention relates to a method of detecting and measuring electrical conductive mineral ore bodies by airborne operations, and, more particularly, to an improved electromagnetic method therefor. The method of the invention comprises creating a plurality of electromagnetic fields, moving the fields relative to an area to be investigated and detecting variations in the moving fields as an indication of, and a measurement for, a conductive body. It further relates to special electromagnetic equipment especially useful for detecting and measuring mineral ore bodies by the aforesaid method and especially adapted for the practical or commercial application of the aforesaid method and in the detection of ore bodies and particularly of sulfide ore bodies.

As is well known to those skilled in the art, various magnetic methods have proved useful in locating ore bodies and much ore has been discovered by the use of the magnetic "dip needle." This type of magnetic method at an early date in a large measure displaced the original location of ores by sight and later, more particularly, precise magnetometers operated from the ground came into use and have been very successful in indicating regions containing magnetite and in a few instances deposits containing sulfide ores in useful quantities. A further advance was the war-time development of the airborne magnetometer which permitted very rapid reconnaissance for magnetic bodies and which likewise might be indicative of mineral ore of commercial value.

In general, in these prior magnetic methods the actuating force is the earth's magnetic field and the measurements are based on the small changes in this normal field due to the increased permeability in regions beneath the magnetometer. However, actual practice has clearly shown that no type of magnetometer alone has been sufficient to offer very firm guidance in exploratory work, particularly where sulfide ore bodies have been sought. For instance, such bodies are often rather feebly magnetic even when they are of good quality, whereas absolutely worthless, disseminated deposits of magnetite, for example, may show much larger magnetic effects. Perhaps not over 10% of the possible magnetic anomalies are in any way associated with sulfides and not all of the sulfide bodies contain useful ore. For these reasons, other more discriminating methods are essential, either for use alone or in conjunction with magnetic methods. The most useful of these is based upon effects arising from the high electrical conductivity of the massive sulfide ore bodies.

Attempts have been made for years to explore by making electrical measurements on the ground, but many difficulties have been encountered. Some of these arose from ignorance of the principles and the limitations of the methods chosen, others from the difficulties in carrying out proper measurements. In some instances, electrical conductors are forced into the ground and current from an external source is passed through the earth while simultaneous measurements of the potential at various points are made. Other methods of more recent development are known which make use of an alternating magnetic field produced by a coil mounted on the ground and operated in various ways. However, substantial difficulties are encountered in these operations due to the fact that the electrical resistivity of the ground or overburden may assume a wide range of values and may seriously obscure the indications.

It should be borne in mind that these electromagnetic methods differ sharply from the magnetic methods earlier described, in that an artificial field is created in the electromagnetic method, whereas the magnetic methods first referred to utilize the local perturbation in the earth's more or less constant field. As mentioned heretofore, the variable conductivity of the overburden has seriously handicapped prior electromagnetic measurements which were made from the ground.

We have discovered that with equipment designed for operation from the air at a substantial distance above the ground, the relative effect of the overburden is substantially reduced so that with proper choice of frequencies, and other equipment to be described, the said operation becomes quite practical. Further, a very large advantage of the airborne equipment is the fact that reconnaissance can be conducted very rapidly and economically, and over terrain which is well nigh impassable during much of the year.

We have found that the conductive bodies which will give indications with the electromagnetic method include massive sulfides, massive magnetite, and graphite, particularly when "slickensided." Of these, our primary interest is in the sulfides, particularly pyrrhotite. Electromagnetic methods alone are not completely satisfactory because they do not discriminate between the several types of conductors above noted. However, when electromagnetic results are coordinated with magnetic results, good discrimination can be obtained by the present method, and the liability of false indications from graphite, for example, is eliminated while massive magnetite, in most cases, also will be eliminated because of its extremely large magnetic anomaly in comparison with its conductivity. Magnetic indications from disseminated magnetite, which might be of the same order as those from pyrrhotite, do not cause trouble, as the electromagnetic method is unaffected by such deposits so that, in general, the two methods complement each other and permit elimination of prospects that are not worth drilling or further developing.

In our airborne method, accurate means for monitoring the flight path must be employed. The methods employed may include the use of optical operations, such as strip photography, radio procedures including Loran, and similar procedures. In carrying our methods into practice, we can simultaneously perform magnetic and electromagnetic exploration from the air. Our present method, however, relates primarily to the electromagnetic method and to an improved electromagnetic system for detecting and measuring, from the aircraft, regions of electrically conductive material, such as commercially valuable ore, even though the latter may be covered with as much as 300 feet of overburden.

It is an object of the present invention to provide a method for detecting and measuring electrical conductive mineral ore bodies employing a plurality of generated or artificially produced electromagnetic fields, moving the fields relative to an area to be investigated and detecting variations in the moving fields as an indication of, and a measurement for, a conductive body.

Another object of the invention is to provide an improved method and means for detecting and measuring conducting bodies operable from a moving craft and which in its operation employs a plurality of electromagnetic fields of different frequency, with a moving of these fields relative to an area to be investigated and the detecting of variations in the resultant moving fields as an indication of, and a measurement for, a conductive body.

The invention also contemplates a method for detecting and measuring conductive bodies from a moving craft by creating at least two electromagnetic fields in such an arrangement that variations due to causes other than the presence of conductive bodies are largely canceled and that detection of the small variations in the fields due to the presence of conductive bodies can be measured and serve to indicate the presence of said conductive bodies.

It is a further object of the invention to provide means for detecting conductive bodies from a moving craft operating in accordance with our improved method and involving a novel combination of means or equpment for creating two frequency distinguished electromagnetic fields of constant relative amplitudes by two mutually orthogonal transmitter coils, means for measuring the variations in the ratio or difference between the two frequency distinguished fields including two mutually orthogonal receiver coils located in a region where the ratio of the detected fields is substantially independent of relative motion of the transmitter and receiver coil system and means responsive to measured variations between the two fields for indicating the presence of a conductive body.

The invention further contemplates, in the accomplishment of the foregoing objects, the provision of an additional coil or coils oriented preferably orthogonally to the receiving coils and operative to indicate the existence of errors due to any abnormal relative motion between the transmitter and receiver coil systems; the employment of an indicating instrument energized from the additional coil in an arrangement to effect motion between the transmitter and receiver coil systems to restore the position of minimum error; and the use of band-pass filtering devices in the detecting system to distinguish between signals from conductive bodies and those which might arise from other causes.

Other objects and advantages of the present invention will become apparent from the following description taken in conjunction with the accompanying drawings, in which:

Fig. 5 depicts a diagrammatic view illustrating the carrying out of the present method by means of aircraft and suspended bomb;

Figs. 6, 7 and 8 are diagrammatic illustrations of the transmitting and receiving coils in an orthogonal relation, the related transmitter and receiver coils of a given frequency F1, and the transmitter and receiver coils in the preferred arrangement and for reference in the quantitative description, respectively;

Fig. 9 illustrates a diagram of a modified arrangement of the energizing and detecting coils;

Figure 1:
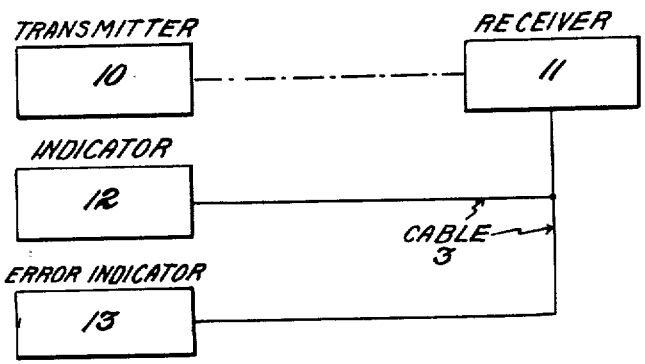
Figure 1 is a block diagrammatic view illustrating equipment which has proved effective in practice in carrying out the present invention.

Figs. 16 and 17 illustrate diagrammatically specific electronic circuits constituting electronic receiving equipment contained within the bomb of which Fig. 16 shows filters 19 and 20 and amplifier 21, and Fig. 17 shows the circuits of filters 24 and 25, detectors 26 and 27 and an output amplifier connected by cable to the indicator or recorder in the aircraft.

Fig. 18 is a graphic representation or record obtained in a test flight over an ore body at the air speed and altitude as noted thereon.

In the electromagnetic methods of geophysical prospecting for mineral ores, an alternating electromagnetic field is produced over a region by current in a coil of wire. The symmetry of this field is distorted by electrically conducting materials, such as sulfide mineral ore bodies. By measuring the field distortion, information can be obtained concerning the existence and nature of these mineral bodies.

The principles of our new method and a complete understanding of the method and equipment for prospecting by this means are described in the following detailed disclosure. In the first part of the disclosure, there is given a description of the actual circuits and apparatus employed for the practical accomplishment of the desired result, and a qualitative physical description. Thereafter there is presented a quantitative or mathematical treatment.

Generally speaking, the present invention contemplates an improved method of employing electromagnetic means energized by an A. C. power source for detecting and measuring electrical conductive mineral ore bodies and which creates a plurality of electromagnetic fields of different frequency, moving the fields relative to an area to be investigated and detecting variations in the fields by means of receiving coils as an indication of and a measurement for a conductive body.

The equipment required to carry our improved method into practice is shown in block diagram form in Figs. 1 to 4 comprising a transmitting unit 10 located in the aircraft, a receiving unit 11 located in the bomb and an indicating unit 12 together with an error indicating and correcting unit 13, both mounted in the aircraft and connected to the receiving unit in the bomb through lines which may form part of the tow cable 3.

Figure 2:
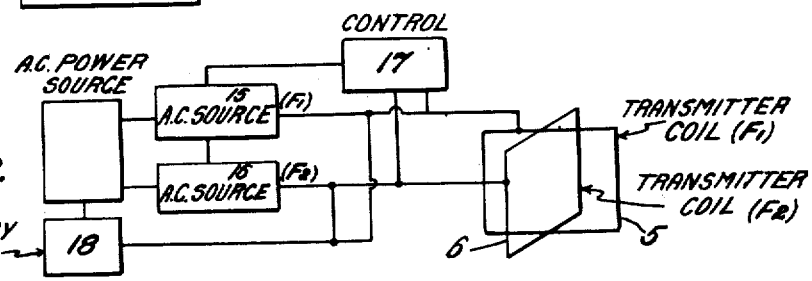
Figs. 2, 3 and 4 are block diagrams illustrating the energizing unit and transmitting coils to be mounted in the aircraft, the receiving unit to be towed behind the aircraft within a suspended container commonly termed the "bomb," and the indicating unit to be mounted in the aircraft, respectively.

The transmitting unit 10 is illustrated in its component form in Fig. 2. The aircraft engine provides power for two transmitters 15 and 16 operating at frequencies F1 and F2. About 500 watts is produced by each of these two transmitters at frequencies of approximately 1900 and 2500 cycles per second. The choice of frequency range is determined by the ore bodies to be measured and by other factors as discussed in a later section and the ratio of the frequencies is chosen to minimize interaction between portions of the apparatus operating at the different frequencies. The outputs of the transmitters 15 and 16 are connected to the mutually orthogonal transmitting coils 5 and 6 respectively, suitably located in the aircraft. These output coils are constructed with approximately 75 turns of #12 wire with a coil area of approximately 35 square feet.

While it is desirable to maintain the ratio of the amplitudes of the two transmitters constant and the ratio preferably near unity, it is only necessary to limit rapid fluctuations of amplitude and a suitable control 17 acting on the difference in amplitudes of the outputs is used to control one of the transmitters.

As the system requires the use of narrow bandpass filters to distinguish between the fields created by coils 5 and 6 it is necessary that the frequencies of the transmitters 15 and 16 be stable. Where alternators are employed for the transmitters a frequency control 18 must be provided.

Figure 3:
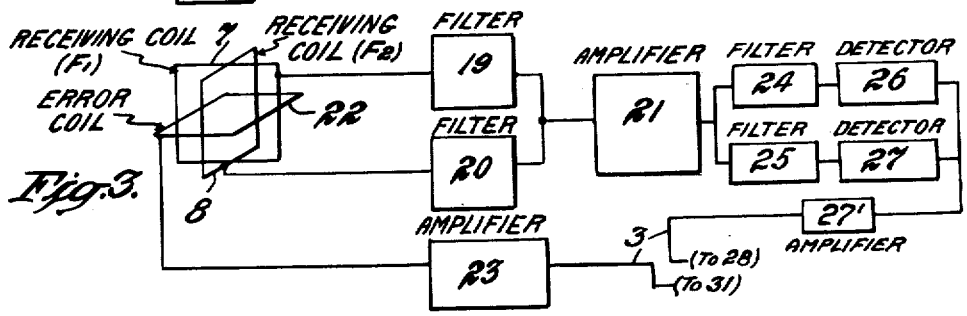

The receiving unit 11 is shown in its component form in the block diagram of Fig. 3. The mutually right angle receiving or detecting coils 7 and 8 operating at frequencies F1 and F2 are connected to the filters 19 and 20. The filters distinguish between the fields detected by the two coils. Tuned detector coils will provide sufficient discrimination between the two frequencies although filters 19 and 20 may be added to alter the shape and width of the passband in the two channels, it being desired that frequency F1 be picked up by coil 7 and frequency F2 be picked up by coil 8. The outputs of the two channels are combined and amplified by the common amplifier 21 and are then separated by filters 24 and 25 into the two frequencies F1 and F2. The relative amplitude of F1 and F2 is compared by the differential rectifiers 26 and 27 and their combined output, the significant part of which is below one cycle per second, is fed by amplifier 27' and by cable 3 to the indicating unit 12 in the aircraft. Considerable noise reduction is obtained by this method of operation. This noise reduction is very important and failure to minimize noise would render the method inoperative.

Shown as mutually orthogonal to both coils 7 and 8, is an error angle measuring coil 22 whose output is connected through the amplifier 23 to the indicating unit assembly through the cable 3. In view of the cosine relationship between signal error and error angle, only error angles of greater than 1° need be indicated in order to faithfully measure signals to an accuracy of 1 part in 1000.

Figure 4:
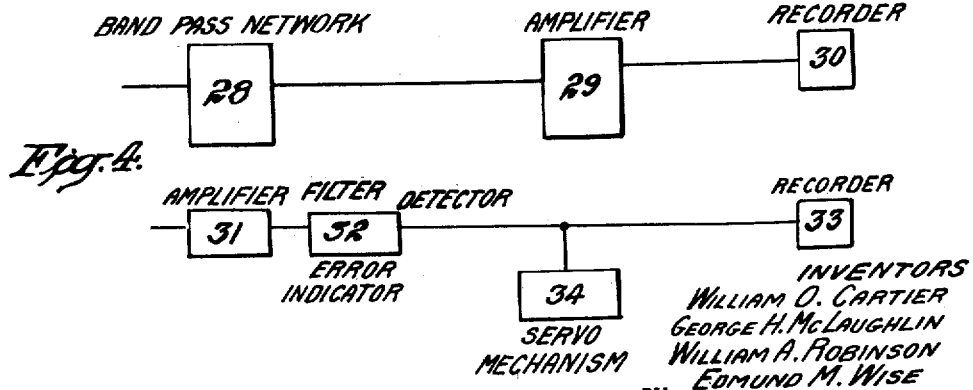

The indicating unit 12 is shown in component form in the block diagrams of Fig. 4. The signal from the bomb is amplified by the amplifier 29 and recorded on a recorder 30. The significant frequencies in the response curve shown in Fig. 15 will, of course, increase directly with the speed of crossing the ore body and also are influenced by other factors, such as the type and orientation of the ore body, the height of flight above the ore body among others. It is desirable to provide a band-pass network 28 in the circuit including amplifier 29 which will pass the significant frequencies and minimize others, principally "noise." "Noise" is here used in the electrical sense and includes all random disturbances which arise from various sources including microphonics and other tube noise, static and natural disturbances of unknown origin.

The error angle signal from the bomb is amplified by amplifier 31 and rectified by the detector 32 of the error indicating unit 13. This error is indicated on the recorder 33. The error signal may also be employed to actuate a servo-mechanism 34 orienting the transmitter coils for minimum error indication.

Although it is desirable to measure the amplitudes of the two fields to 1 part in 1000 it is only necessary to measure the difference to roughly 1 part in 10. Consequently only single stages of filtering provided by the coupled circuits are required for the filters 24 and 25.

Figs. 16 and 17 illustrate, by connected reading, the specific circuit arrangements employed within the bomb for feeding the responses of the detector coils to the aircraft. Fig. 16 shows the circuits of filters 19 and 20 connected by plug and jack terminal connectors P1 and J1 to the amplifier 21 the circuits of which include the amplifier tubes 60, 61 and 62 and are completed through plug and jack connectors J2—P2 and J3—P3 and wherein the amplifier unit is connected by terminal connector J4 to the plug connector P4 of Fig. 17. Fig. 17 illustrates the networks of filters 24 and 25 connected to detector circuits 26 and 27 through grids of amplifier tube 63 feeding rectifiers 65, 66, 67 and 68. The output of detectors 26 and 27 is connected to a control grid of amplifier tube 64 the output of which is connected by connector J5 to the band-pass networks 28 as indicated.

Fig. 18 shows the recorded results of a flight over a known ore body at an altitude of 650 feet. The response at this altitude is particularly important because it is not possible to maintain an operational altitude of even 500' in rugged terrain at all times and demonstrates the feasibility of operations in such territory.

Although the recorders indicated in Fig. 4 are D'Arsonval movement pen recorders, the records may also be applied to magnetic tape or wire recorders, photographic recorders or any other type of suitable recorder.

While the illustrated equipment provides a practical means for carrying into practice our improved method, it will be appreciated that the exact form of satisfactory equipment is merely an application of the electronic art to our method and is well understood by those skilled in the art.

Figures 11, 12:
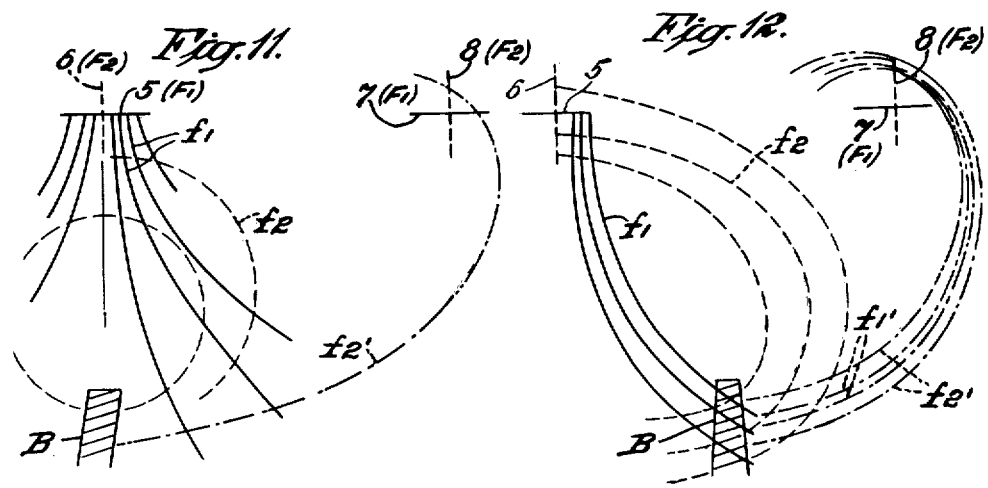
Fig. 11 is a diagram for explanation purposes and illustrates a field condition for detecting by one arrangement of the energizing and detecting coils with a conductive ore body immediately beneath the aircraft.
Fig. 12 is a diagram similar to Fig. 11 but wherein the aircraft and bomb are moved to a new position relative to the conductive ore body.

As will be readily understood with reference to Figs. 11 and 12, the orthogonal relationship of the electromagnetic fields (primary fields) created by energizing coils 5 and 6 is disturbed by the presence of a conductor where the primary electromagnetic field set up by the energizing coil 5 of the system operating at frequency F1 is shown as a solid line field pattern marked $f1$, and the primary electromagnetic field set up by energizing coil 6 of the system of differing frequency F2, is shown dotted and marked $f2'$. The secondary field set up by linkage of primary field $f1$ with a conductive body B is indicated as $f1'$, while the secondary field set up by linkage of primary field $f2$ with a conductive body B is indicated as $f2'$.

In Fig. 11 the conductive body B, shown as a vertical conductor, is shown directly below the energizing coils which may be considered as directly below the aircraft. In this relative position of aircraft and conductive body it will be seen that primary field $f1$ does not cut across or link with the conductor while primary field $f2$ has maximum coupling therewith. The result is that no secondary field is created to effect a spacial angle of change of the resultant field of frequency F1, while a relatively large secondary field $f2$, will effect a spacial change of the resultant electromagnetic field of frequency F2.

The result at the bomb therefor is a difference in the response of coil 7, which arises essentially from the undisturbed primary field $f1$, and that of coil 8 which responds to the resultant of primary field $f2$ and secondary field $f2'$. This difference in response at the bomb is an indication of the presence of a secondary field and hence is an indication of the presence of a conductor and gives some indication of the nature of such conductor which may be an ore body.

Figure 12 illustrates the linkage of primary fields $f1$ and $f2$ with the conductive body B when the aircraft has passed over the conductor and the bomb has not yet passed over the conductor. As both primary fields $f1$ and $f2$ become linked with the conductive body B, two secondary fields $f1'$ and $f2'$ are set up. The response of the detector coils to the resultant fields depends upon the coupling between the primary fields $f1$ and $f2$ and the conductor and the detector coils, i. e. the degree to which electromagnetic fields of frequency F1 and frequency F2 are disturbed by the presence of the conductor B and hence on the position and orientation of the conductor relative the aircraft and bomb. There will be some points where, even with a conductor present, the responses of the two detector coils will be similar but as the aircraft crosses the conductor, at some point there will always be a difference in the responses of the two detector coils sufficient to indicate the presence of the conductive body.

A suitable modification of the present invention, in its broader aspect, is shown in Fig. 9 wherein the electromagnetic fields are created by two energizing coils which are arranged parallel and located close together and operated at two different frequencies and desirably with the same current amplitude, or, as an equivalent the two frequencies may be applied to a single coil. With this arrangement the two primary fields in the ratio of their amplitude will be constant throughout space as will the directions of the two primary fields. While it is desirable to have the amplitude of the outputs of the two sources of the same order it is only necessary to limit rapid fluctuations of amplitude or to maintain a constant or known ratio between outputs of the two sources.

In this instance, where the primary electromagnetic fields maintain a constant ratio to each other throughout space, the presence of a conductor can only be detected when the two fields linking with a conductor give rise to different secondary field effects. Such difference in the secondary fields, however, must depend solely on the difference in linkage with the conductor due to difference in frequency of the electromagnetic fields.

Where the conductor or region linked possesses a low conductivity, such as that characteristic of a disseminated sulfide ore body, the secondary field effects do change appreciably with frequency and hence can be detected and measured by noting the changes in the ratio of the two resultant electromagnetic fields.

Where the conductor possesses a high conductivity such as that characteristic of massive sulfide bodies, appreciably differences of secondary field effects due to frequency difference in the linking electromagnetic fields are found only at very low frequencies where operation of the present method is physically difficult with airborne equipment due to the size and weight of the required apparatus. Therefore, although the use of parallel electromagnetic fields completely eliminates variations between the so-called "primary" fields due to relative movement or change of spacing of the energizing and detecting coils through all regions of space (as later discussed), this method has the disadvantage of depending solely on the difference between the secondary fields in the conducting ore body for detection at the two widely different frequencies.

In practical airborne operations, in accordance with the preferred embodiment, it is desirable that the frequencies energizing the primary coils are within a range of from about 250 to about 5000 cycles per second. Of course, sufficient separation between the frequencies employed must be provided to permit frequency discrimination for detecting purposes.

The selection of frequencies is an engineering problem in which the electromagnetic reaction of the ore body and that of the overburden are but one factor, and depend somewhat upon the altitude of the transmitting and detecting coils above the ground. Others are the permissible weight and size of the equipment, the interference from natural and "man-made" static, including inductive effects from power lines, particularly from harmonics in said lines, and to direct and harmonic "cross talk" between the pair of frequencies employed to energize the coils. In general, the two frequencies so employed should not be harmonically related but preferably should be in the ratio of two large prime numbers.

In the preferred arrangement, where the pair of energizing coils are perpendicular to each other and the two main detecting coils also are perpendicular to each other, the ratio of the direct fields picked up by the two major detecting coils is substantially constant as long as the bomb occupies certain limited regions in space relative to the airplane. Under certain conditions, an ore body might also equally perturb the pick-up from the two detector coils. However, this only can occur under a very special relation between the transmitter, ore body, and the detector coils, so that it can only occur transiently as the airplane moves with reference to the ore body and therefore occasions no real difficulty. The important advantage of this arrangement of coils is that the weak field due to the ore body can be measured at the bomb despite the co-present large direct field from the transmitter and the considerable movement of the detecting system with respect to the transmitting system.

To the end of giving those skilled in the art a further and more complete understanding of the invention and its technical application, a quantitative mathematical presentation of the factors involved is now given.

*Quantitative mathematical treatment*

In the region of a coil of wire $$H \alpha \frac{NAI}{r^3}$$

$H$ = magnetic field
$N$ = number of turns of wire
$A$ = area of coil
$I$ = current passing through the wire
$r$ = distance from the center of the coil In order to measure the distortion of this alternating field at any point in space, the magnitude of the field must exceed that due to interfering electrical "noise" fields. Away from "man-made" sources, these "noise" fields have a magnitude of the order of $3 \times 10^{-8}$ $$3 \times 10^{-8} \sqrt{\frac{\Delta F}{F}} \text{ gauss}$$

where $\Delta F$ is the band-pass of the measuring equipment. This figure then determines the power, weight and dimensions of the necessary electromagnetic field source.

At distances of several times the diameter of the coil the field may be approximated by a dipole where

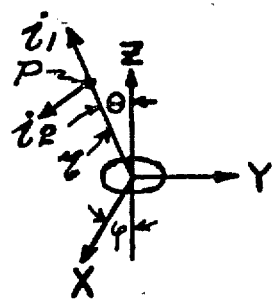

$$H \alpha \left( \frac{2 \cos \theta}{r^3} i_1 + \frac{\sin \theta}{r^3} i_2 \right)$$

From this it is evident that the field is symmetrical with regard to the $\varphi$ coordinate. Furthermore, in regions of $\theta = 0$ and $$\theta = \frac{\pi}{2}$$

the amplitude and direction are relatively constant with respect to the $\theta$ coordinate.

Consequently, a simple measurement of the distortion of the field may be made by determining the degree of departure from these symmetrical relationships.

Figure 13:
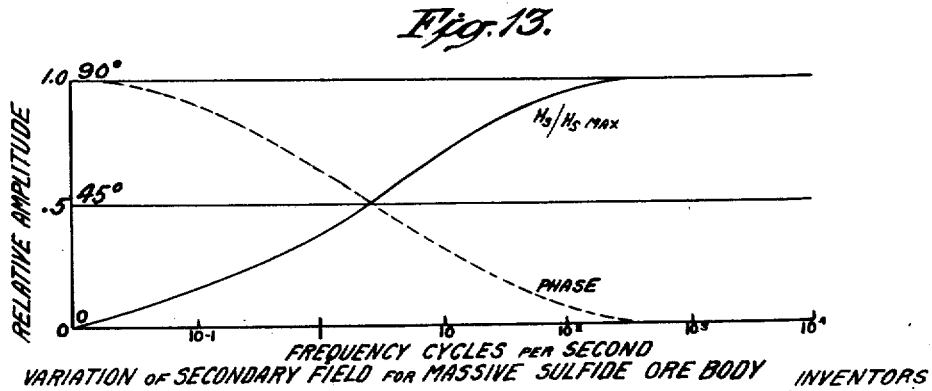
Fig. 13 depicts a graphical representation with illustrative curves indicating the variation with frequency of the secondary field for massive sulfide ore bodies.
Figure 14:
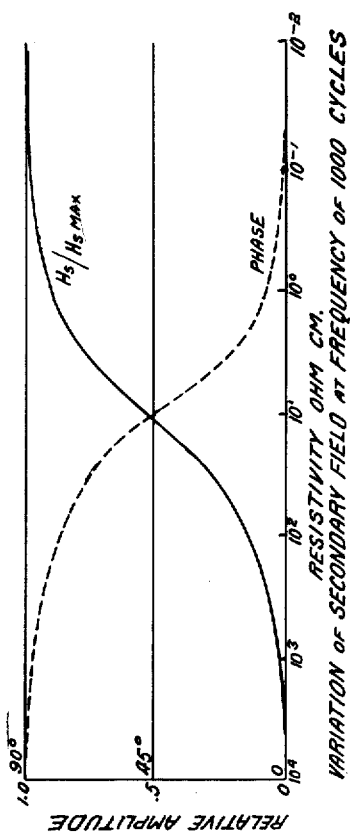
Fig. 14 is a similar graphic representation illustrating the effect of variation of the resistivity of the conductor on the secondary field at a frequency of one thousand cycles.

With respect to the influence of an electrically conducting ore body, the distortion of the primary alternating field from a transmitter coil may be considered as the superposition of a secondary field caused by induced electrical current in the interior of the ore body. The rigid solution of the resultant fields from this problem has not been achieved. The results of experimental studies of the magnitude and phase of the secondary field, the frequency of the primary field and the resistivity of the ore body material are illustrated in Figs. 13 and 14. The frequency ranges from near zero to 20,000 cycles and the resistivities are of the order of $10^{-3}$ to $10^3$ ohm cm.

For the lower resistivities of the order of $10^{-1}$ to $10^{-3}$ ohm cm., such as those of highly concentrated sulfide deposits, the phase angle is essentially zero (i. e. the secondary field in phase with the primary field) and the amplitude is essentially independent of frequency. For high resistivity of the order of $10^3$ ohm cm., as in the case of clay, swamp, or water overburden, the phase is essentially 90° and the amplitude is proportional to frequency even for frequencies as high as several thousand cycles.

An operating frequency is chosen to minimize the influence of the finite conductivity of clay or swamp on the surface of the earth. Trouble from the latter is particularly bad when measurements are made on the ground, so that in practice, 1000 cycles has commonly been used. At this frequency the maximum secondary field is obtained for massive sulfide bodies and only a small secondary field is obtained from clay or swamp on the surface of the earth. Moreover, this discrimination can be further increased by measuring only the "in phase" component of the secondary field. However, at very low frequencies the "out of phase" component of massive sulfide bodies becomes significant and could be used to indicate the presence of conductive ore bodies.

Since the bulk and weight of the equipment increases with decrease in frequency, the optimum frequency is the highest frequency that can be employed without significant indications from conducting overburden. As referred to heretofore, the frequency of 1000 cycles per second has proven satisfactory for measurements conducted on the earth's surface. For airborne measurements, the operating frequency can be considerably increased, with resulting decrease in bulk and weight of equipment, as the height above ground is increased. Tests to date indicate that this maximum operation frequency would be of the order of 5000 cycles per second.

For a tabular conductive ore body of size to be commercially valuable (viz. 1000 feet long, 500 feet wide) and as much as 300 feet below the ground, the secondary field at a point 500 feet from the transmitter (both the transmitter and detector being on the surface of the ground) may be as much as 15% to 20% of the field strength existing at a point 500 feet from the transmitting coil. The actual strength of the total field at the measuring point is, of course, inversely proportional to the cube of the distance between the measuring point and the transmitter coil.

In making measurements from the surface of the ground, the measuring station is chosen in the plane of the vertical transmitter coil. Then the vertical component of the secondary field is proportional to the angle of the resultant field with the horizontal, and the measurement of this angle, the so-called "dip" angle, has been used as an indicator of a conducting body.

Although measurements have been carried out from the ground for the past two decades, many new problems arise in attempts to secure useful information from the air. These problems have heretofore been insuperable.

If the measurements are made with a transmitter coil and detector or measuring coil, both located on the aircraft, (i. e. with a separation of the order of 25 feet), the intensity of the direct field from the transmitter coil, at the receiving coil, is so great that the relative effect of conductive bodies upon the resultant field is puny (i. e. less than one part in a million) for a practical flying height above ground. The measurement of so small a change in field is not practical in an airplane, where the relative position of the coils, etc. is subject to various distortions and vibrations—indeed, a difference of at least one hundred times this value would be required for reasonable reliability.

If the detecting equipment is placed in a bomb, as in Fig. 5, and towed behind the aircraft at a distance of 500 feet, the expected distortion field is of the order of one part in $10^2$. But in this case, the continual changes in separation distance and relative orientation of the aircraft and bomb introduce serious errors.

The present invention provides a method for measuring the secondary fields from conducting ore bodies and for canceling the errors introduced by the relative motion of the transmitting coil in the aircraft, and the detecting equipment in the bomb, so that practical and reliable indications of conductive ore bodies can be secured despite some relative movement between transmitter and detector—normally the airplane and the bomb.

In Fig. 5 the origin of a coordinate system is located on the aircraft. Then all relative motions of these two bodies may be resolved into:
1. Rotation of the axis system,
2. Rotation of the bomb,
3. Displacement of the bomb without rotation.

The changes in field measured at the bomb are due both to conducting bodies and to relative motion between aircraft and bomb. If it were possible to introduce a reference system, giving indications of the relative motion similar to those of the measuring system but giving no indication of conducting bodies, the problem would be solved. To satisfy these conditions, the reference system must provide a non-electromagnetic field of force following the same laws as the measuring field. An acoustical dipole, a dipole light source or a zero frequency magnetic dipole have been considered as reference fields, but the difficulties of producing and detecting such fields to the accuracies required are substantial.

Another solution or modification is capable of use, even if the reference field indicates the conductive bodies, as long as the amplitude and phase of the indications are different from those of the measuring system. This modification consists in employing a second transmitting and detecting coil reference system parallel to the main measuring system but operating at a frequency substantially different from the main measuring frequency. By reference to Fig. 13, it is apparent that by employing a very low frequency (as low as 10 cycles per second) in the reference system and recording the ratio between the measured fields at the two frequencies, or, more practically, by recording the difference between indications of the two fields, the effects of relative motion between aircraft and bomb can be canceled and the response of the conducting body can be measured with negligible error. In this case, as shown in Fig. 13, the primary and secondary fields for the two frequencies are not identical because of the impedance characteristics of the conducting ore body. However, the physical problems of the weight and space required to obtain adequate accuracy at low frequencies introduce many difficulties.

A practical solution to the problem of measuring a secondary field, despite variations in the primary field, can be found by choosing a reference system which follows the same laws as the main measuring system.

This arrangement is illustrated in Fig. 8. The measuring system consists of transmitter coil T1 and detector coil D1 operating at frequency F1, the reference system consists of transmitter coil T2 and detector coil D2, operating at frequency F2. The two frequencies are only sufficiently different to facilitate separately measuring the two electromagnetic fields at the bomb.

In the case of the aircraft and bomb, flying over a vertical tubular body (shown at P in Fig. 10) at an angle of 45° to the strike of the ore body, a simple calculation of the resulting indication may be made by assuming the amplitude of the secondary field of each system to be the product of the fields produced at P by unit current in both the transmitting and detecting coils. This assumption is equivalent to considering that the secondary fields originate from a dipole located at P, and is accurate only for an ore body located at great distance from measuring point.

For the measuring system T1 and D1

$$H_{T_1} \propto \left[\frac{2x^2-y^2-z^2}{r^5}i_1 + \frac{3xy}{r^5}i_2 + \frac{3xz}{r^5}i_3\right]$$

$$H_{D_1} \propto \left[\frac{2x_D^2-y_D^2-z_D^2}{r_D^5}i_1 + \frac{3x_Dy_D}{r_D^5}i_2 + \frac{3x_Dz_D}{r_D^5}i_3\right]$$

$$H_{T_1} \cdot H_{D_1} \propto \frac{1}{(y^2+z^2)^{3/2} \cdot (y_D^2+z_D^2)^{3/2}}$$

Since aircraft and bomb are crossing conductor $x = x_D = 0$

Figure 15:
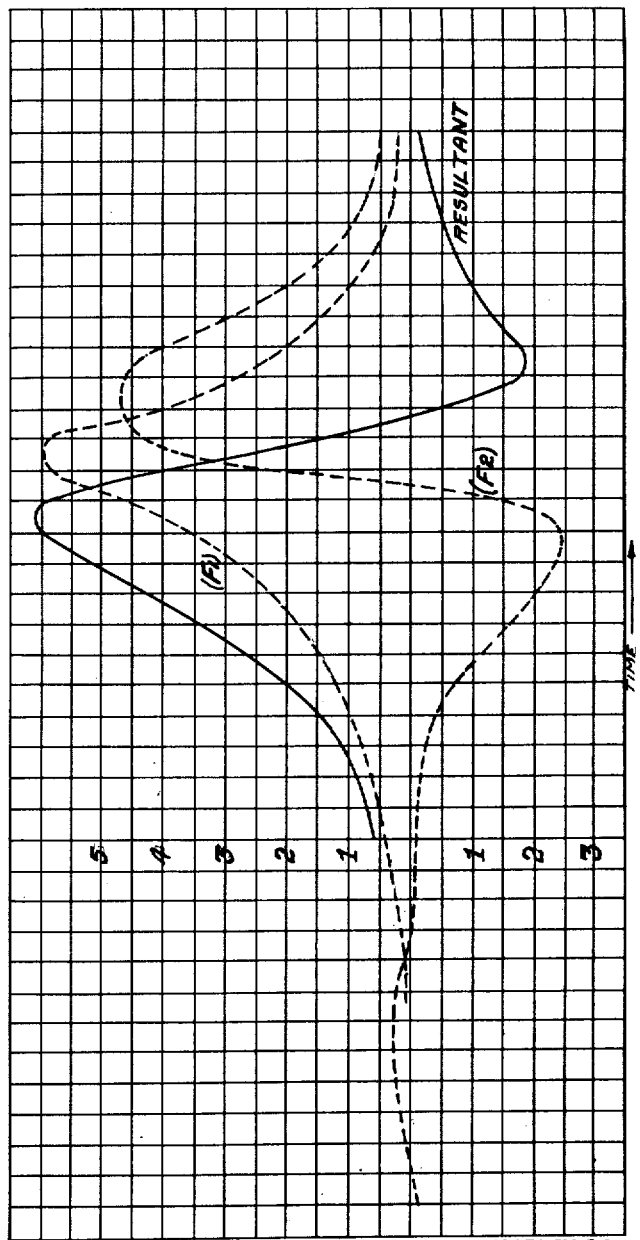
Fig. 15 is a graphic representation of the response as the aircraft and bomb pass over the conductor or ore body.

The curve of this response as the aircraft and bomb pass over the conductor is shown in Fig. 15.

For the reference system T2 and D2

$$H_{T_2} \propto \left[\frac{3xz}{r^5}i_1 + \frac{3yz}{r^5}i_2 + \frac{2z^2-x^2-y^2}{r^5}i_3\right]$$

$$H_{D_2} \propto \left[\frac{3x_Dz_D}{r_D^5}i_1 + \frac{3y_Dz_D}{r_D^5}i_2 + \frac{2z_D^2-x_D^2-y_D^2}{r_D^5}i_3\right]$$

$$H_{T_2} \cdot H_{D_2} \propto \frac{2z^2-y^2}{(z^2+y^2)^{5/2}} \cdot \frac{2z_D^2-y_D^2}{(z_D^2+y_D^2)^{5/2}}$$

when $x$ and $x_D = 0$

This curve is shown in Fig. 15. The difference curve is then the resulting response as the aircraft and bomb move over the conducting body. In Fig. 5, the normal position of the bomb is chosen such that the derivatives of the two fields with respect to the $x$ and $y$ coordinates vanish, and so the derivatives with respect to the $r$ coordinate are equal. It can be shown that three possible transmitter coil orientations satisfy these conditions, viz:

| Measuring System | Reference System |
|---|---|
| $yz$ plane | $xy$ plane |
| $yz$ plane | $xz$ plane |
| $zz$ plane | $xy$ plane |

The choice of preferred orientation is dependent on the types of relative motion most commonly encountered with the particular aircraft and bomb to be employed.

For the orientation illustrated in Fig. 8, all relative motion between aircraft and bomb may be resolved into some combination of a rotation of the aircraft ($\theta$), about the origin, a rotation of the bomb about its center of gravity ($\alpha$) in a plane parallel to $\theta$ and a relative rotation ($\varphi$) of aircraft and bomb with respect to the axis joining these two elements.

The errors introduced by $\varphi$ are to a first order of approximation independent of $\theta$ and $\alpha$ and are proportional to $$\left(1-\frac{1}{2}\sin^2\varphi\right) \text{ or } \cos\varphi$$

The variations introduced into the measuring system $T_1$ and $D_1$ for rotations $\theta$ and $\alpha$ are proportional to $$1-\frac{1}{2}\sin^2(\theta-\alpha)+\sin\theta\sin\alpha$$

For the reference system $T_2$ and $D_2$ $$1-\frac{1}{4}\sin^2(\theta-\alpha)-\frac{1}{4}\sin^2\theta-\frac{1}{4}\sin^2\alpha$$

For small angles (less than 3°) these are all substantially cosine functions and introduce negligible error. Moreover, it is easily possible to indicate the existence of such errors.

Figure 10:
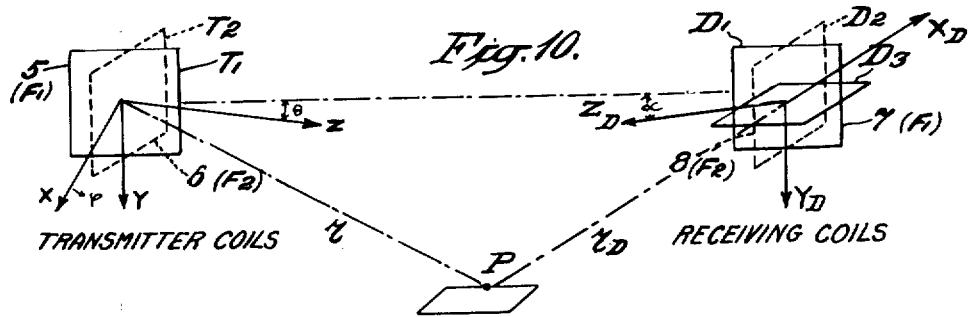
Fig. 10 is a view similar to Fig. 8 showing the preferred arrangement of the energizing and detecting coils and including an additional receiving coil or error coil in orthogonal relation to the detector coils.

In Fig. 10, an additional receiver coil has been added at right angles to $D_1$ and $D_2$. For $\theta=\alpha=\varphi=0$ no signals are introduced in $D_3$; and when either of $\theta$, $\alpha$ or $\varphi$ is finite, signals are introduced in $D_3$ either at frequency $F_1$ or $F_2$ which for small angles (less than 10°) are approximately linear functions of $\theta$ or $\alpha$ or $\varphi$. Consequently, it is possible to employ an error coil $D_3$ which indicates the presence of errors due to relative movements between aircraft and bomb, but does not respond appreciably to the presence of a conductive body.

From the description of the errors from rotations $\theta$ and $\alpha$ it can be shown that these errors vanish for $\theta=0$ or in other words, for the condition of the axis of the transmitter coil system intersecting the bomb. For the orientation of measuring coil in the $yz$ plane and reference coil in the $xz$ plane, all errors except those due to rotation of the bomb vanish when the axis of the transmitter coil system passes through the bomb. Accordingly, by employing a servo system in the aircraft designed to orient the transmitter coil system to a position of zero signal from the error coil $D_2$, located in the bomb, all errors due to relative movements of the aircraft and bomb may be eliminated with the exception of a minor long period error which results from relative rotations of the bomb in the direction of the $\theta$ coordinate.

Analogous to the above method of measuring the difference in amplitude or, more correctly, the amplitude ratio of the measuring and reference fields F1 and F2 is a method of measuring the variation in angular direction of the two fields. In Fig. 7, a detector coil D is shown at right angles to a transmitter coil T, and thus parallel to the field from the transmitter coil. The field measured by the detector coil is proportional to H sin $\varphi$ where $\varphi$ is angular departure from the orthogonal coil arrangement shown and H the transmitted field. Consequently, the accuracy of determination of the direction of the primary field H or of the relative position of the detector coil is dependent on the minimum detectable signal from the detector coil and the magnitude of the field H. The distortion of the electromagnetic field by a conducting ore body is measureable in terms of the angular rotation produced in the resultant field.

The ambiguity between variation in the direction of the transmitted field and the variation in orientation of the detecting coil can be removed by the addition of a reference system composed of a second transmitting coil and detecting coil, as shown in Fig. 6.

The amplitude of the response and the errors resulting from relative motion of aircraft and bomb follow very similar laws to those of the previously discussed method. Thus the angle between the measuring and reference field in the vicinity of the bomb is given by $$\cos\alpha=\frac{H_1\cdot H_2}{|H_1|\cdot|H_2|}$$

when $$H_1 \propto \left(\frac{2\sin\theta\cos\varphi}{r^3}i_1-\frac{\cos\varphi\cos\theta}{r^3}i_2+\frac{\sin\varphi}{r^3}i_3\right)$$

$$H_2 \propto \left(\frac{2\sin\theta\sin\varphi}{r^3}i_1-\frac{\cos\theta\sin\varphi}{r^3}i_2-\frac{\cos\varphi}{r^3}i_3\right)$$

$$\cos\alpha=\frac{-\frac{1}{2}\sin 2\varphi\sin^2\theta}{(1-\sin^2\varphi\sin^2\theta)^{1/2}(1-\cos^2\varphi\sin^2\theta)^{1/2}}$$

The angle between the two electromagnetic fields is $$\frac{\pi}{2}$$

for $\theta=0$, or for $\varphi=0$, $$\frac{\pi}{2}$$

or $\pi$. Furthermore, the changes in angular direction of the two fields for other values of $\theta$ and $\varphi$ are cosine functions of the relative rotation between aircraft and bomb.

Although in principle these two methods (namely, measurement of field distortion of a conducting ore body, by the amplitude variation and by the angular variation between two electromagnetic fields) are analogous, in practice, the previously described amplitude method requires the least complexity of equipment.

The present invention provides equipment capable of accurately detecing and measuring conductive mineral ore bodies and capable of eliminating the errors usually introduced by the relative motion of the elements of the apparatus, which heretofore have rendered impractical all efforts to conduct airborne conductor explorations.

While the exact form of equipment may vary to enable the practical carrying out of the present invention, it will be appreciated that an airborne conductor measurement method employing two detecting systems, such as described, enables the secondary fields at the bomb to be detected and the signals correctly recorded and interpreted despite variations in the position of the bomb relative to the aircraft.

It is to be observed that the present invention provides a method for detecting and measuring conductive mineral ore bodies such as sulfide ore bodies with a practical degree of fidelity by the employment of a plurality of frequency distinguished electromagnetic fields, moving of the distinguished fields relative to the area to be investigated and detecting variations in the moving fields as an indication of a conductive ore body. Moreover, the method and apparatus of the invention provide for practical airborne detection of conductive ore bodies with frequency distinguished electromagnetic fields in a specific arrangement to cancel the effect of variations in the fields due to causes other than those due to the proximity of the conducting ore bodies whereby the detection of the variations of the frequency distinguished fields gives an accurate detection and measure of the ore body. The present invention, by the further employment of an error indicating coil associated with the receiving coils, provides for indicating any serious malposition of the pick-up coils in the bomb with respect to the transmitting coils which error indications are or may be employed to orient the transmitter coil system at the aircraft to a minimum error orientation thereby to obtain greater accuracy of ore detection and measurement, or in any event serve to warn the operator that indications must be checked.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An airborne electromagnetic device adapted for detecting and measuring a conductive ore body comprising, in combination with an aircraft and a bomb towed behind the aircraft, a pair of energizing coils mounted in the aircraft in mutually orthogonal relation, a pair of power sources of different frequency energizing said coils to radiate electromagnetic fields of different frequencies, a pair of detector coils mounted in said bomb in mutually orthogonal relation and in planes substantially parallel to the planes of said energizing coils, frequency discriminating means operative to discard the response of one of said detector coils to electromagnetic fields of one of said frequencies and to discard the response of the other of said detector coils to electromagnetic fields of the other of said frequencies, means for feeding the responses of said detector coils to said aircraft, and means mounted in said aircraft operative to compare the responses of said detector coils.

2. An airborne electromagnetic device adapted for detecting and measuring a conductive ore body comprising, in combination with an aircraft and a bomb towed behind the aircraft, a pair of energizing coils mounted in the aircraft in mutually orthogonal relation, a pair of power sources of different frequency energizing said coils to radiate electromagnetic fields of different frequencies, a pair of detector coils mounted in said bomb in mutually orthogonal relation aligned in planes substantially parallel to the planes of said energizing coils, frequency discriminating means operative to discard the response of one of said detector coils to electromagnetic fields of one of said frequencies and to discard the response of the other of said detector coils to electromagnetic fields of the other of said frequencies, means for feeding the responses of said detector coils to said aircraft, and means mounted in said aircraft operative to compare the responses of said detector coils and an error indicating coil arranged mutually orthogonal to the detector coils to detect misalignment of said detector and energizing coils, and means in said aircraft for detecting error signals from said error coil.

3. An electromagnetic device adapted for detecting sulfide ore bodies including pyrrhotite, even in the presence of magnetic bodies including magnetite, comprising in combination with an aircraft and a bomb towed behind the aircraft, means mounted in the aircraft including orthogonally arranged transmitter coils for creating two frequency distinguished electromagnetic fields energized by currents of substantially equal amplitude, means mounted in the bomb responsive to each of said frequency distinguished fields including orthogonally arranged receiving coils parallel to the transmitter coils, means mounted in the aircraft for recording the difference in the responses from the frequency distinguished fields, and means for detecting variations in the fields responsive to relative motion between the aircraft and bomb.

4. An electromagnetic device for detecting and measuring conductive mineral ore bodies from an aircraft comprising, in combination with an aircraft and a bomb towed behind the aircraft, means mounted in the aircraft for creating two frequency-distinguished electromagnetic fields by currents of substantially equal amplitude, means mounted in the bomb responsive to each of said frequency-distinguished fields, means mounted in the aircraft for comparing the differences in the responses from the distinguished fields as an indication and measure of a conductive body, and means mounted in the bomb to detect variations in the fields as a result of relative motion between aircraft and bomb.

5. An electromagnetic device for detecting and measuring conductive mineral ore bodies from an aircraft comprising, in combination with an aircraft and a bomb towed behind the aircraft, means mounted in the aircraft for simultaneously creating two orthogonally arranged frequency distinguished electromagnetic fields by currents of substantially equal amplitude and having a frequency of from about 250 cycles per second to about 5000 cycles per second, means mounted in the bomb responsive to each of said frequency distinguished fields, means mounted in the aircraft for comparing the differences in the responses from the distinguished fields as an indication and measure of a conductive body, and means mounted in the bomb to detect variations in the fields as a result of relative motion between aircraft and bomb.

6. An electromagnetic device adapted for detecting and measuring conductive ore bodies from an aircraft comprising, in combination with an aircraft and a bomb towed behind the aircraft, a plurality of energizing coils mounted in said aircraft with the coils in mutual orthogonal relation, a power source energizing one of said coils to produce an electromagnetic field, a power source having a frequency differing from the aforesaid source energizing the other of said coils to produce a second electromagnetic field differing in frequency from the aforesaid field, a pair of detector coils arranged on said bomb, filtering means associated with said detector coils to select the response of one detector coil to one of said electromagnetic fields and the other detector coil to the other of said electromagnetic fields, said detector and energizing coils being relatively located with said bomb towed behind said aircraft to render the responses of said detector coils substantially equal with the electromagnetic fields undisturbed by the presence of a conductive body, and means mounted in said aircraft and connected with said filters for indicating differences in responses of said detector coils to indicate the presence of a conductive body disturbing at least one of said electromagnetic fields.

7. An electromagnetic device adapted for detecting sulfide ore bodies including pyrrhotite, even in the presence of magnetic bodies including magnetite, comprising in combination with an aircraft and a bomb towed behind the aircraft, means mounted in the aircraft including orthogonally arranged transmitter coils for creating two frequency distinguished electromagnetic fields energized by currents of substantially equal amplitude, means mounted in the bomb responsive to each of said frequency distinguished fields including orthogonally arranged receiving coils parallel to the transmitter coils, and means mounted in the aircraft for recording the difference in the responses from the frequency distinguished fields.

8. An electromagnetic device for detecting and measuring conductive mineral ore bodies from an aircraft comprising, in combination with an aircraft and a bomb towed behind the aircraft, transmitting means mounted in the aircraft for creating orthogonally related, frequency-distinguished electromagnetic fields by currents of substantially equal amplitude and having a frequency of from about 250 cycles per second to about 5000 cycles per second, detecting means mounted in the bomb responsive to each of said frequency-distinguished fields, means mounted in the aircraft and connected to the detecting means for comparing the differences in the responses from the distinguished fields as an indication and measure of a conductive body, and means mounted in the bomb operative to detect variations in the fields as a result of relative motion between aircraft and bomb.

9. An electromagnetic device for detecting and measuring conductive mineral ore bodies from an aircraft comprising, in combination with an aircraft and a bomb towed behind the aircraft, means mounted in the aircraft for simultaneously creating orthogonally related frequency-distinguished electromagnetic fields by currents of substantially equal amplitude and having a frequency of from about 250 cycles per second to about 5000 cycles per second, detecting means mounted in the bomb responsive to each of said frequency-distinguished fields, and means mounted in the aircraft and connected to the detecting means for comparing the differences in the responses from the distinguished fields as an indication and measure of a conductive body.

10. An electromagnetic device adapted for detecting and measuring conductive ore bodies from an aircraft comprising, in combination with an aircraft and a bomb towed behind the aircraft, a plurality of energizing coils mounted in said aircraft with the coils in mutual orthogonal relation, a power source energizing one of said coils to produce an electromagnetic field having a frequency of from about 250 cycles per second to about 5000 cycles per second, a power source having a frequency within said range and differing from the aforesaid source energizing the other of said coils to produce a second electromagnetic field differing in frequency from the aforesaid field, a pair of detector coils arranged on said bomb, filtering means associated with said detector coils to select the response of one detector coil to one of said electromagnetic fields and the other detector coil to the other of said electro magnetic fields, said detector and energizing coils being relatively located with said bomb towed behind said aircraft to render the responses of said detector coils substantially equal with the electromagnetic fields undisturbed by the presence of a conductive body, and means mounted in said aircraft and connected with said filters for indicating differences in responses of said detector coils to indicate the presence of a conductive body disturbing at least one of said electromagnetic fields.

11. An electromagnetic device adapted for detecting sulfide ore bodies including pyrrhotite, even in the presence of magnetic bodies including magnetite, comprising in combination with an aircraft and a bomb towed behind the aircraft, means mounted in the aircraft including orthogonally related transmitter coils for simultaneously creating two frequency-distinguished electromagnetic fields and having a frequency of from about 250 cycles per second to about 5000 cycles per second and energized by currents of substantially equal amplitude, detecting means mounted in the bomb responsive to each of said frequency-distinguished fields including orthogonally arranged receiving coils parallel to the transmitter coils, and means mounted in the aircraft and connected to the detecting means for recording the difference in the responses from the frequency-distinguished fields.

WILLIAM OLIVER CARTIER.
GEORGE HARRISON McLAUGHLIN.
WILLIAM ALLAN ROBINSON.
EDMUND MERRIMAN WISE.

REFERENCES CITED

The following references are of record in the file of this patent:

UNITED STATES PATENTS

| Number | Name | Date |
|---|---|---|
| 1,818,331 | Jakosky | Aug. 11, 1931 |
| 1,938,534 | Peters | Dec. 5, 1933 |
| 2,139,460 | Potapenko | Dec. 6, 1938 |
| 2,468,554 | Hull | Apr. 26, 1949 |
| 2,559,586 | Bjarnason | July 10, 1951 |

OTHER REFERENCES

"Geophysical Exploration" Preliminary Report, on "The Airborne Magnetometer," by James R. Balsley, Jr., published by U. S. Department of the Interior. 1946.

Certificate of Correction

Patent No. 2,623,924                                          December 30, 1952

WILLIAM OLIVER CARTIER ET AL.

It is hereby certified that error appears in the printed specification of the above numbered patent requiring correction as follows:

Column 1, line 15, after "method" strike out "and"; column 7, line 50, for "f2" read *f2'*; column 8, line 45, for "appreciably" read *appreciable*; column 9, line 51, strike out "$3 \times 10^{-8}$"; column 12, line 41, for "tubular" read *tabular*; column 13, line 53, for "$\theta = a = \varphi - 0$" read *$\theta = a = \varphi = 0$*; column 14, line 69, for "detecing" read *detecting*; column 18, line 22, for "electro magnetic" read *electromagnetic*;

and that the said Letters Patent should be read as corrected above, so that the same may conform to the record of the case in the Patent Office.

Signed and sealed this 6th day of October, A. D. 1953.

[SEAL]

ARTHUR W. CROCKER,
*Assistant Commissioner of Patents.*